United States Patent [19]

Kim

[11] 4,255,396

[45] Mar. 10, 1981

[54] PROCESS FOR SEPARATING MOLYBDENUM VALUES FROM TUNGSTEN VALUES

[75] Inventor: Tai K. Kim, Bradford, Pa.

[73] Assignee: GTE Products Corporation, Stamford, Conn.

[21] Appl. No.: 105,002

[22] Filed: Dec. 18, 1979

[51] Int. Cl.$^3$ .................. C01G 39/00; C01G 41/00
[52] U.S. Cl. .................. 423/54; 75/101 BE; 423/DIG. 14; 423/139; 423/21.5
[58] Field of Search .................. 423/54, DIG. 14; 75/101 BE

[56] References Cited

U.S. PATENT DOCUMENTS

| | | | |
|---|---|---|---|
| 3,576,595 | 4/1971 | Chiola et al. | 423/54 |
| 3,607,007 | 9/1971 | Chiola et al. | 423/54 |
| 3,607,008 | 9/1971 | Chiola et al. | 423/54 |
| 3,751,555 | 8/1973 | Peterson | 423/54 |
| 3,969,478 | 7/1976 | Zelikman et al. | 423/54 |
| 4,018,865 | 4/1977 | Gallacher | 423/DIG. 14 |

FOREIGN PATENT DOCUMENTS 967823  8/1964  United Kingdom .................. 423/54

OTHER PUBLICATIONS

Fleischka et al., "Chelates in Analytical Chemistry", vol. 1, Marcel Dekker, Inc., N.Y., 1967, pp. 332–346.
van Dalen et al., "Proceedings of the International Solvent Extraction Conference", vol. II, Soc. of Chemical Industry, London, 1971, pp. 1096–1100.

*Primary Examiner*—Herbert T. Carter
*Attorney, Agent, or Firm*—Robert E. Walter

[57] ABSTRACT

The efficiency of an extraction process using a dialkyl phosphoric acid as an active extractant for separating extractable soluble metallic values from an aqueous solution is improved by the presence of a sufficient amount of a dialkyl naphthalene sulphonic acid as a modifier for the extractant.

1 Claim, No Drawings

PROCESS FOR SEPARATING MOLYBDENUM VALUES FROM TUNGSTEN VALUES

BACKGROUND OF THE INVENTION

The present invention relates to a process for increasing the efficiency of extraction processes using a liquid dialkyl phosphoric acid as an active extractant for separating soluble metallic values from an aqueous solution.

The use of liquid dialkyl phosphoric acids as active extractants is known.

U.S. Pat. No. 3,607,008 to Chiola et al discloses a process for separating molybdate values from tungstate values using a water insoluble three component organic extractant phase consisting essentially of di-2-ethylhexyl phosphoric acid as an extractant, tributyl phosphate as a solubilizer and a water insoluble hydrocarbon solvent to extract at least a portion of the molybdate values from the feed solution.

U.S. Pat. No. 3,438,768 to Ashbrook et al discloses a process for separating cobalt from nickel in an ammoniacal leach solution with organophosphoric acid compounds including di(2-ethylhexyl) phosphoric acid.

U.S. Pat. No. 3,598,520 to Chiola et al describes a process for the solvent extraction of heavy rare earth elements with an alkyl phosphoric acid.

U.S. Pat. No. 3,591,331 to Chiola relates to a process for producing ammonium metatungstate from ammonium tungstate with an organic extractant solution comprising di-2-ethylhexyl phosphoric acid and a water-insoluble hydrocarbon solvent.

U.S. Pat. No. 3,582,263 to Chiola et al describes a process for the purification of gadolinium wherein the extractant comprises didecyl phosphoric acid, tributyl phosphate and an organic hydrocarbon solvent.

U.S. Pat. No. 3,969,478 to Zelikman et al. describes a process for separating tungsten and molybdenum by the introduction of a stabilizer comprising water soluble phosphorus salts and hydrogen peroxide as a complexing agent. The molybdenum is selectively extracted from the resulting aqueous solution with tri-n-butyl phosphate.

The above patents describe the use of modifiers with the organic extractant or complexing agents with the aqueous feed solution to enhance the extraction of the extractable metallic values into the organic extractant.

SUMMARY OF THE INVENTION

In accordance with the present invention, there is provided a process for increasing the efficiency of an extraction process using a liquid dialkyl phosphoric acid as an active extractant for separating extractable soluble metallic values from an aqueous solution comprising contacting the aqueous solution containing the extractable metallic values with an organic liquid extractant consisting of a liquid dialkyl phosphoric acid suitable for extracting said extractable soluble metallic values, a sufficient amount of a dialkyl naphthalene sulphonic acid as a modifier for increasing the separation efficiency of the organic liquid extractant, and a water insoluble organic solvent, said contacting being for a sufficient period of time to extract at least a portion of said extractable metallic values from said aqueous solution.

DETAILED DESCRIPTION

Dialkyl phosphoric acids are employed in extraction process to separate extractable metallic values from other various unextractable metallic values. Soluble molybdenum, tungsten, cobalt, nickel, terbium, ytterbium, gadolinium, and cerium values may be concentrated according to various prior art processes employing dialkyl phosphoric acids as an active extractant.

The active dialkyl phosphoric acids typically have the following formula

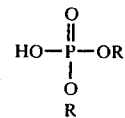

wherein R is selected from the group consisting of an alkyl radicals of from about eight to about 12 carbon atoms. R may be substituted with a variety of groups such as alkoxy, halogens, etc. provided that there is no interference in the performance of the organic phosphoric acid in extracting the appropriate metallic value from the aqueous phase to the organic phase. Typical dialkyl organophosphoric acids include di(2-ethylhexyl) phosphoric acid, heptadecylphosphoric acid, dodecylphosphoric acid, di(1-methylheptyl) phosphoric acid, diisooctylphosphoric acid, di(2-ethyl-4-methylpentyl) phosphoric acid, di(2-propyl-4-methylpentyl) phosphoric acid, and the like.

A wide variety of organic solvents in which the active extractant is dissolved can be employed. The solvent should be substantially water-immiscible. It should dissolve the active extractant and not interfere with the function of the organic extractant in extracting the desired soluble metallic values. Typical solvents include petroleum distillate solvents, such as kerosene, naphtha, benzene, toluene and the like. Various other aliphatic or aromatic hydrocarbons, and halogenated hydrocarbons may be utilized. The volume percent of active extractant employed as a volume percent of the total organic used can be varied with wide ranges. Typically the active organic extractant comprises about 5 to about 95 percent by volume of the total organic extractant.

In accordance with the process of the present invention, organic liquid extractant comprises a liquid dialkyl phosphoric acid suitable for extracting said extractable soluble metallic values, a sufficient amount of a dialkyl naphthalene sulphonic acid as a modifier for increasing the extraction efficiency of the organic liquid extractant, and a water insoluble organic solvent. The dialkyl naphthalene sulphonic acid preferably has from about 18 to about 24 carbon atoms and may be substituted provided that the substituents do not interfere with the efficiency enhancing properties of the modifier. It has been found that small quantities of the modifier may significantly enhance the efficiency of the extraction process. It is generally desirable to employ the modifier up to an amount whereby no further improvement in extraction efficiency is observed. Generally it has been found that the modifier is used an amount less than 5 percent by volume based on the volume percent of active extractant employed.

Contacting the aqueous solution containing metallic values to be extracted with the organic extractant may be carried out by any of the well known procedures employed in liquid-liquid extractions. Although continuous countercurrent methods are preferred, batch, continuous batch, and batch countercurrent methods may also be employed. Any suitable liquid-liquid contacting means may be employed such as a column, a vessel equipped with a mixer or merely shaking the organic extractant phase and aqueous phase in a closed container. Generally, it has been found that from about 20 to 30 minutes of contact time between the organic extractant phase and the aqueous feed solution is sufficient. Shorter periods of contact lower the efficiency and more stages are generally needed to achieve higher efficiencies. Longer periods of contact generally do not improve the efficiency but lower the throughput of the system.

The temperature during the extraction step can be varied up to about 45° C. Higher temperatures can result in degratation of the extractant solution. Temperatures of about 20° C. to about 40° C. are preferred.

The organic extractant containing the extracted metallic values is separated from the aqueous solution by permitting a phase separation due to the differences and densities between the aqueous and organic liquids. The aqueous solution may be further processed in a conventional manner to recover metallic ions concentrated therein and the organic extractant phase is also further processed in the conventional manner to strip the extracted metallic values.

In general, the volumetric ratio of the extractant to the aqueous feed solution can be varied over a wide range and achieve some of the benefits of the present invention.

Also, in accordance with another aspect of the present invention, the aqueous solution from which the metallic values are extracted comprises a liquid water soluble aliphatic hydroxy carboxylic acid of about 4 carbon atoms as a complexing agent. Typical aliphatic hydroxy carboxylic acids are lactic, malic and citric acids. Tartaric acid is the most preferred aliphatic dihydroxy carboxylic acid.

The complexing agent is generally added to the starting aqueous solution in excess of a stoichiometric amount needed to complex with the metallic value being extracted.

In the case where molybdenum values present in solution as molybdate ion is extracted from tungsten values present in solution in the form of the tungstate ion it has been found that the present invention results in improved extraction efficiency, especially in the case wherein the molybdate concentration is relatively high.

In a typical process, the tungsten source material from which it is desirable to extract molybdenum values is a tungstate solution produced as a result of caustic digestion of an impure tungsten source such as impure tungsten oxide or tungsten containing ores preferably using sodium hydroxide as a caustic. As can be appreciated, these materials can contain molybdenum or the corresponding molybdate as impurity. Potassium hydroxide can also be used as a caustic source, however, sodium hydroxide is preferred.

It is desired to have the starting solution be an acidic solution at a suitable pH so that the metallic to be separated remains in solution and is not precipitated as tungstic acid. Any mineral acid can be used to acidify the aqueous feed solution. Sulfuric acid is generally preferred because of its ease of handling, reaction and cost. The pH of the starting solution is preferably from about 1 to about 3.0. A higher pH can result on the formation of extractable tungstate species and unextractable molybdenum species. A lower pH, that is below about 1, can result in the formation of insoluble tungstic acid. Additionally, lower pH ranges do not advantageously affect the process of this invention and the use of the excess acid merely adds unnecessary cost of the process, therefore, a pH of about 2 is preferred.

In the above case, to take advantage of the immiscibility of the organic solvent with the aqueous solution, it is preferable that the active organic extractant comprise from about 20 to about 60 percent by volume based on the total organic phase. It has been found that the modifier should be employed from an effective amount up to about less than about 5 percent by volume based on the volume of the active extractant employed. Preferably the upper range is less than about 2 percent by volume based on the volume of the active organic extractant employed.

To more fully illustrate this invention, the following detail examples are presented. All parts, proportions, ratios and percentages are on a volumetric basis unless otherwise stated.

EXAMPLE I

A starting solution containing about 150 grams per liter of the sodium tungstate and about 8 grams per liter of sodium molybdate was prepared. About 35 grams of a 0.23 molar tartaric acid solution was added to a 1 liter portion of the solution. The pH of the solution was adjusted to about 1.8 with the addition of concentrated sulfuric acid. An organic solution comprising about 50 percent by volume di-2-ethylhexyl phosphoric acid, about 0.25 percent by volume dinonylnaphthalene sulphonic acid and the remainder Kermac 470B organic solvent, which is a kerosene type petroleum distillate, were mixed to form an organic extractant phase. Equal volumes, 50 millimeter portions of the organic extractant phase and aqueous starting solution were shaken mechanically in a 125 milliliter separatory funnel for about 30 minutes. After shaking and settling, equal volumes, about 5 milliliters each of the organic and aqueous phase were removed and analyzed for molybdenum content. One of the techniques used to determine the effectiveness of extractants is by the use of minor amounts of radioisotopes of the various elements in a more concentrated solution. By this procedure, a distribution coefficient (kd) that is the ratio of the amounts of the particular elements in the extractant phase to the amount of the element in the aqueous phase can be determined. Comparison of the distribution coefficients between two elements is a measure of the effectiveness of separation. The ratio of Kd of the elements is known as the separation factor. Therefore, in the separation of molybdenum from the tungstate solution, it is desired to have relatively high values for the distribution coefficient for molybdenum indicating that relatively high amounts of molybdenum are extracted and relatively low values of tungsten are extracted. Based on the above technique, the Kd was determined to be 8.09 representing a percent extraction of molybdenum of 89 percent. The Kd of tungsten was determined to be 0.012. The separation factor is 674.

EXAMPLE II

The procedure according to Example I was followed with the exception that 0.1 molar tartaric acid was used and the pH of the finally adjusted solution was 1.8. The Kd of molybdenum was 2.46 representing a 71 percent extraction of molybdenum. The Kd of tungsten was determined to be 0.010. The separation factor is 246.

EXAMPLE III

The procedure according to Example I was performed except that tartaric acid was not added to the aqueous starting solution. The Kd of molybdenum was 0.98 representing a 49 percent extraction. The Kd of tungsten was determined to be 0.024.

EXAMPLE IV

The Example was performed according to the procedure of Example III except that a 6 percent by volume tribunyl phosphate was substituted for the dinonyl naphthalene sulphonic acid used in Example I. Commercially available kerosene was used instead of the Kermac 470B. The Kd of molybdenum was 0.45 representing a percent extraction of 31 percent. The Kd of tungsten was determined to be 0.020. The separation factor is 23.

For the purposes of comparison the results of the above Examples are summarized in the following Table. The separation factor (S.F.) is Kd of Mo/Kd of W.

| Extraction System | Kd of Mo | Kd of W | % Extractor | S.F. |
| --- | --- | --- | --- | --- |
| I. DNNS | | | | |
| Tartaric Acid | 8.09 | 0.012 | 89 | 674 |
| II. DNNS | | | | |
| Tartaric Acid | 2.46 | 0.010 | 71 | 246 |
| III. DNNS | | | | |
| No Tartaric Acid | 0.98 | 0.024 | 49 | 41 |
| IV. TBP | | | | |
| No Tartaric Acid | 0.45 | 0.020 | 31 | 23 |

While there has been shown and described what are at present considered to be the preferred embodiments of the present invention, it will be obvious to those skilled in the art that various changes and modifications may be made therein without departing from the scope of the invention as defined by the appended claims.

I claim:

1. A process for separating molybdenum values from tungsten values comprising forming an acid solution of molybdate ions and tungstate ions at a pH of from about 1 to about 3, contacting said solution with an organic extractant consisting essentially of from about 20 to 60 volume percent di-2-ethylhexyl phosphoric acid as an active extractant, an effective amount up to less than about 5 volume percent of said active extractant of dinonylnaphthalene sulfonic acid as a modifier for increasing the efficiency of extraction of molybdate ions, tartaric acid as a complexing agent, and the remaining volume portion of said organic extractant being a water insoluble organic solvent, said contacting being for a sufficient period of time to extract molybdenum values from said solution.

* * * * *